United States Patent
Chinh et al.

[11] Patent Number: 6,056,927
[45] Date of Patent: May 2, 2000

[54] EQUIPMENT AND PROCESS FOR GAS-PHASE OLEFIN POLYMERIZATION

[75] Inventors: Jean-Claude Chinh, St Mitre les Remparts; Robert Pes, Martigues, both of France

[73] Assignee: BP Chemicals Limited, London, United Kingdom

[21] Appl. No.: 08/915,565

[22] Filed: Aug. 21, 1997

[30] Foreign Application Priority Data

Aug. 23, 1996 [FR] France ................................... 96 10538

[51] Int. Cl.[7] .................................. B01J 8/24; C08F 2/34
[52] U.S. Cl. ........................... 422/139; 422/144; 422/145
[58] Field of Search .................................. 422/139–145; 526/65, 88, 901

[56] References Cited

U.S. PATENT DOCUMENTS

| | | | |
|---|---|---|---|
| 4,003,712 | 1/1977 | Miller | 422/145 |
| 5,171,541 | 12/1992 | Raufast | 422/145 |
| 5,382,638 | 1/1995 | Bontemps et al. | 526/67 |
| 5,633,333 | 5/1997 | Chinh | 526/65 |

FOREIGN PATENT DOCUMENTS

| | | |
|---|---|---|
| 0 071 430A | 2/1983 | European Pat. Off. . |
| 250169 | 12/1991 | European Pat. Off. . |
| 0 728 771A | 8/1996 | European Pat. Off. . |
| 981 775A | 5/1951 | France . |
| 2 599 991A | 12/1987 | France . |
| 2 642 429A | 8/1990 | France . |
| 2 730 999 | 8/1996 | France . |
| 1 375 741A | 11/1974 | United Kingdom . |

*Primary Examiner*—Hien Tran
*Attorney, Agent, or Firm*—Finnegan, Henderson, Farabow Garrett & Dunner, L.L.P.

[57] ABSTRACT

The invention relates to an equipment for gas-phase polymerization of olefin(s), including a reactor with a fluidized and optionally mechanically stirred bed, and a conduit for withdrawing polymer, provided with an isolation valve, and a conduit for emptying polymer, provided with an isolation valve, the said conduits connecting the side wall of the reactor to a single recovery gas lock equipped with a discharge valve, equipment characterized in that the withdrawal conduit leaves the side wall of the reactor at a height of the reactor wall, above the fluidization grid, ranging from $0.60 \times H$ to $0.95 \times H$, while being directed downwards, with the result that any part of the said conduit forms with a horizontal plane an angle A ranging from 35 to 90°, and in that the emptying conduit leaves the side wall of the reactor at a height of the reactor wall, above the fluidization grid, ranging from $0.01 \times H$ to $0.20 \times H$.

6 Claims, 5 Drawing Sheets

EQUIPMENT AND PROCESS FOR GAS-PHASE OLEFIN POLYMERIZATION

BACKGROUND OF THE INVENTION

The present invention relates to equipment and to a process for gas-phase polymerization of olefin(s) in a fluidized and optionally mechanically stirred bed, particularly with a device improving the withdrawal and the emptying of the polymer manufactured.

It is known to polymerize one or more olefins in the gaseous phase at a pressure which is higher than atmospheric pressure in a reactor with a fluidized bed and a vertical side wall, where polymer particles being formed are kept in the fluidized state above a fluidization grid by virtue of a reaction gas mixture containing the olefin(s) to be polymerized and traveling according to an upward stream. The polymer thus manufactured in powder form is generally withdrawn from the reactor by at least one side discharge conduit situated along the vertical wall of the reactor above the fluidization grid and is then subjected to a decompression and degassing stage. The reaction gas mixture leaving via the top of the fluidized-bed reactor is returned to the base of the latter under the fluidization grid through the intermediary of an external circulation conduit provided with a compressor. While being returned, the reaction gas mixture is generally cooled with the aid of at least one heat exchanger provided in the external circulation conduit so as to remove the heat produced by the polymerization reaction. The polymerization is carried out in the presence of a catalyst or of a catalyst system introduced into the fluidized bed. High-activity catalysts and catalyst systems, which have been known already for a number of years, are capable of producing large quantities of polymer in a relatively short time, thus avoiding a stage of removal of the catalyst residues in the polymer.

When the polymer is withdrawn from the reactor, it is found to be accompanied by the reaction gas mixture present under pressure in the reactor. It has been observed that the proportion of the reaction gas mixture accompanying the polymer which is withdrawn is generally high. This makes it necessary to provide large-sized devices for decompressing and degassing the polymer which is withdrawn, and an appropriate and costly device for recovering and recompressing the reaction gas mixture withdrawn with the polymer and for recycling most of this gas mixture into the polymerization reactor. Such devices generally include a gas lock for polymer recovery, connected to the side wall of the fluidized-bed reactor by a withdrawal conduit fitted with an isolation valve. The recovery gas lock may also be connected to a decompression and degassing chamber by a discharge conduit, itself fitted with an isolation valve. In most cases the withdrawal conduit leaves the side wall of the reactor in a direction that is perpendicular to the said wall, that is to say in a horizontal plane. It then reaches a recovery gas lock either while still remaining in the same horizontal plane, as described in U.S. Pat. No. 4,003,712, French Patent No. 2 642 429 or European Patent No. 188 125, or while descending vertically after having formed an elbow, as described in European Patent No. 71 430. The withdrawal conduit may also leave the side wall of the reactor while being directed downwards and while forming a relatively small angle with a horizontal plane, for example an angle of 18° as shown in FIG. 1 of French Patent No. 2 599 991, and next reach a recovery gas lock while descending vertically after having formed an elbow. It has been observed that, in all cases, the proportion of the reaction gas mixture accompanying the polymer which is withdrawn is relatively high and results in the abovementioned disadvantages. To solve this problem, European Patent No. 71 430 proposes to add to the recovery gas lock both a vent conduit connecting the gas lock to the fluidized-bed reactor at a point situated above the withdrawal conduit and a second recovery gas lock connected to the first gas lock by a connecting conduit.

In their French Patent No. 2730999, filed on Feb. 24, 1995, the Applicants have since then proposed equipment and a process for gas phase polymerization of olefin(s) making it possible to avoid the abovementioned disadvantages. Described therein is equipment for the gas phase polymerization of olefin(s) including a reactor with a fluidized and optionally mechanically stirred bed and with a vertical side wall, provided at its base with a fluidization grid, a conduit for external circulation of a reaction gas mixture, connecting the top of the reactor to the base of the latter under the fluidization grid and including a compressor and at least one heat exchanger, and at least one conduit for withdrawing polymer, provided with an isolation valve and connecting the side wall of the reactor to a recovery gas lock equipped with a discharge valve, which equipment is characterized in that the withdrawal conduit leaves the side wall of the reactor while being directed downwards, with the result that any portion of the said conduit forms with a horizontal plane an angle A ranging from 35 to 90°.

While the equipment and the method indicated above have completely solved the problems which have been raised, the Applicants have found that the installation of the device described in their French Patent No. 2730999 could present some disadvantages. In fact, as shown in FIG. 1 of French Patent No. 2730999, the installation of this withdrawal device involves a positioning of the branch connection for the withdrawal conduit at a relatively high level of the reactor. This means that the polyethylene which is below the branch connection for the withdrawal conduit cannot be drawn off from the reactor. This polyethylene which cannot be withdrawn may represent considerable proportions of the total quantity of polyethylene present in the reactor. One of the solutions for removing this polyethylene could consist in increasing the relative height of the reactor in relation to the ground and, as a result, lowering the relative height of the branch connection for the withdrawal conduit in relation to the bottom of the reactor. Although technically viable, this solution would, however, be found to be extremely costly.

Equipment and a process for gas-phase polymerization of olefin(s) have now been found which make it possible to avoid the abovementioned disadvantages. In particular, they make it possible to withdraw and empty in an extremely simplified and efficient manner a polymer manufactured in a fluidized-bed reactor, considerably reducing the proportion of the reaction gas mixture withdrawn with the polymer, while avoiding blocking the withdrawal and emptying system, and while allowing easy installation in industrial plants.

SUMMARY OF THE INVENTION

The subject of the present invention is first of all equipment for gas-phase polymerization of olefin(s), including a reactor with a fluidized and optionally mechanically stirred bed and with a vertical side wall, provided at its base with a fluidization grid, a conduit for external circulation of a reaction gas mixture, connecting the top of the reactor to the base of the latter under the fluidization grid and including a compressor and at least one heat exchanger, and at least one conduit for withdrawing polymer, provided with an isolation valve and at least one conduit for emptying polymer, provided with an isolation valve, the said conduits connecting the side wall of the reactor to a single recovery gas lock equipped with a discharge valve, equipment characterized in that at least one withdrawal conduit leaves the side wall of the reactor at a height of the reactor wall, above the fluidization grid, ranging from 0.60×H to 0.95×H, while being directed downwards, with the result that any part of the said conduit forms with a horizontal plane an angle A ranging from 35 to 90°, and in that at least one emptying conduit leaves the side wall of the reactor at a height of the reactor wall, above the fluidization grid ranging from 0.01×H to 0.20×H.

DETAILED DESCRIPTION OF THE INVENTION

The equipment of the present invention includes particularly at least one conduit for withdrawing polymer, which is directed downwards in order to connect the vertical side wall of the reactor to a recovery gas lock, and every part of which forms with a horizontal plane an angle A ranging from 35 to 90°, preferably from 40 to 90° and in particular from 45 to 90° or from 50 to 90°. This withdrawal conduit thus does not comprise any horizontal portion nor any slightly inclined portion forming with a horizontal plane an angle that is, for example, smaller than 35°.

In the present definition an angle A is intended to mean any acute or right angle that the lengthwise axis of the withdrawal conduit forms with a horizontal plane, this applying to every portion of the conduit ranging from the vertical side wall of the reactor to the recovery gas lock. If a portion of the withdrawal conduit (12c) such as shown diagrammatically in FIG. 4 forms an obtuse angle with a horizontal plane, in this case the obtuse angle A'$_3$, it will be considered that, according to the present definition, the angle A shall be the smaller angle, that is to say the acute angle supplementary to the obtuse angle, in this case the acute angle A$_3$, supplementary to the obtuse angle A'$_3$.

Figure 2:
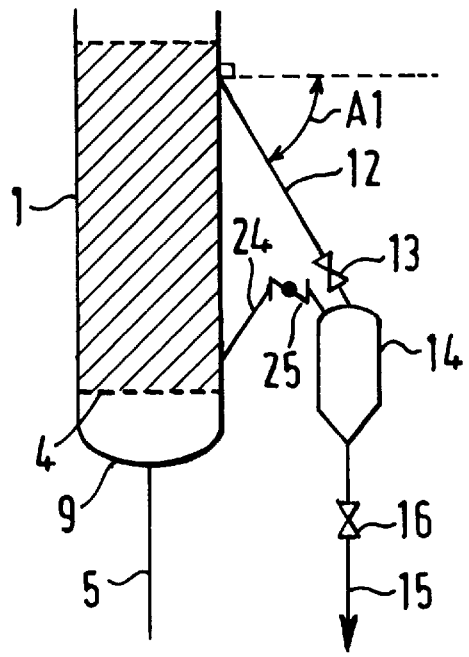
FIGS. 2, 3 and 4 show diagrammatically alternative forms of the withdrawal and emptying device of the equipment according to the present invention.
Figure 3:
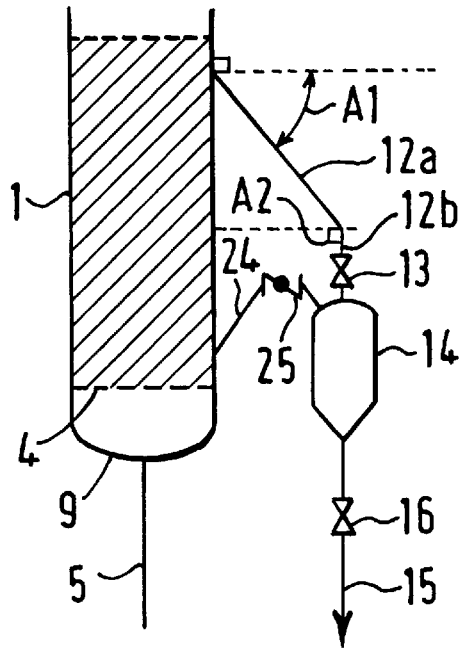
Figure 4:
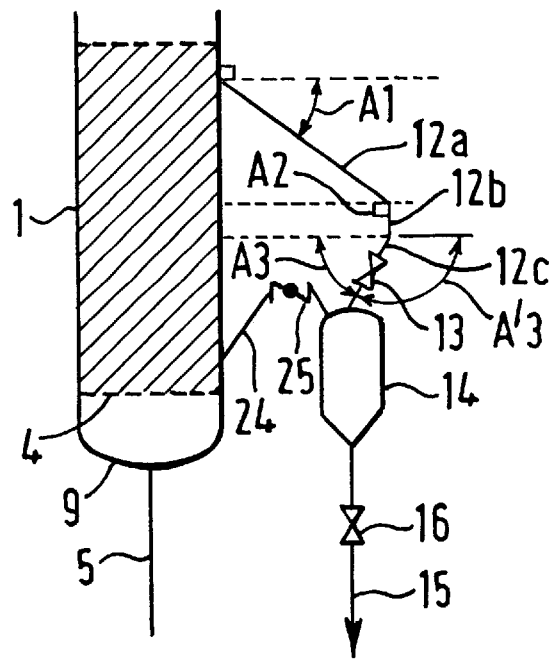

The withdrawal conduit may consist of a single rectilinear conduit (12) such as shown diagrammatically in FIG. 2, or of a joined succession of two or a number of rectilinear conduits (12a, 12b, 12c) such as are shown diagrammatically in FIGS. 3 and 4, it being possible for the joined part(s) between two rectilinear conduits to be one or more portions of a curved conduit.

At the point of departure where the withdrawal conduit leaves the vertical side wall of the reactor, the initial angle A which the conduit forms with a horizontal plane may assume any value such as that mentioned. The initial angle A, is preferably smaller than 90°, preferably not greater than 85° and in particular not greater than 80°. It may assume any value ranging from 35° to a value that is smaller than 90°, preferably ranging from 40 to 85° and in particular from 45 to 80° or from 50 to 80°.

The equipment of the present invention also includes a conduit for emptying polymer which connects the vertical side wall of the reactor to the same recovery gas lock. This conduit for emptying polymer is preferably directed upwards to connect the vertical side wall of the reactor to the recovery gas lock.

The emptying conduit may also consist of a single rectilinear conduit or of a joined succession of two or a number of rectilinear conduits, it being possible for the joined part(s) between two rectilinear conduits to be one or more portions of a curved conduit.

The fluidized bed may occupy the whole of the reactor with a vertical side wall, a reactor which rises to a height H starting from the fluidization grid. In this case the point of departure where the withdrawal conduit leaves the vertical side wall of the reactor may be situated at any level of the said wall above the fluidization grid ranging from 0.60×H to 0.95×H, preferably from 0.70×H to 0.90×H, whereas the point of departure where the emptying conduit leaves the vertical side wall of the reactor may be situated at any level of the said wall above the fluidization grid ranging from 0.01×H to 0.20×H, preferably from 0.02×H to 0.10×H.

In practice the fluidized bed generally occupies only a portion of the fluidized-bed reactor, with the result that the height of the fluidized bed, h, is equal to 0.95×H, preferably 0.90×H and in particular 0.85×H, thus avoiding excessive entrainments of polymer particles out of the reactor. In this case the point of departure of the withdrawal conduit may be situated at any level of the reactor wall above the fluidization grid, ranging from 0.60×H to 0.95×H, preferably 0.90×H and in particular 0.85×H.

As withdrawal conduit it is preferred to employ very particularly a withdrawal conduit consisting of two joined portions of rectilinear conduit (12a, 12b) such as those shown diagrammatically in FIG. 3. The first portion of the conduit leaves the vertical side wall at an initial angle, A, as described above, preferably ranging from 45 to 75°, and in particular from 50 to 70°. The second portion of the conduit, joined to the first for example by a curved portion, is vertical (A+90°).

The withdrawal and emptying conduits have an internal diameter than can range from 25 to 200, preferably from 50 to 150 mm, which generally depends on the flow rates of powder to be withdrawn from the reactor. The internal diameter is preferably constant from one end to the other of the conduits. The internal volume of the conduits (V$_1$) may be between ½ and ⅕₀₀, preferably between ⅕ and ½₀₀, in particular between ⅒ and ½₀₀ the internal volume of the recovery gas lock (V$_2$).

The withdrawal and emptying conduits are provided with an isolation valve which is preferably a valve with a spherical core and in particular a nonrestricted passage, which generally has a flow opening of a diameter that is close to or identical with the internal diameter of the conduit. In the case of the withdrawal conduit, the isolation valve is preferably of a fast-opening pneumatic type operating, for example, at an opening speed of less than 1 second. This isolation valve is preferably situated near the recovery gas lock, with the result that the internal volume of the portion of the conduit ranging from the vertical side wall of the reactor as far as the isolation valve is substantially identical with $V_1$. In the case of the emptying conduit, it is not necessary for the isolation valve to be provided with a fast-opening device.

The recovery gas lock is preferably a closed vessel into which the withdrawal and emptying conduits provided with an isolation valve emerges in its upper part, preferably at its top. It may, in particular, include in its lower part, preferably in its lowest part, an opening provided with a discharge valve communicating with a decompression and degassing chamber through the intermediary of a connecting conduit. The internal volume of the recovery gas lock is preferably between $\frac{1}{10}$ and $\frac{1}{3000}$, in particular between $\frac{1}{100}$ and $\frac{1}{2000}$ the internal volume of the reactor with a fluidized bed and vertical side wall.

Figure 1:
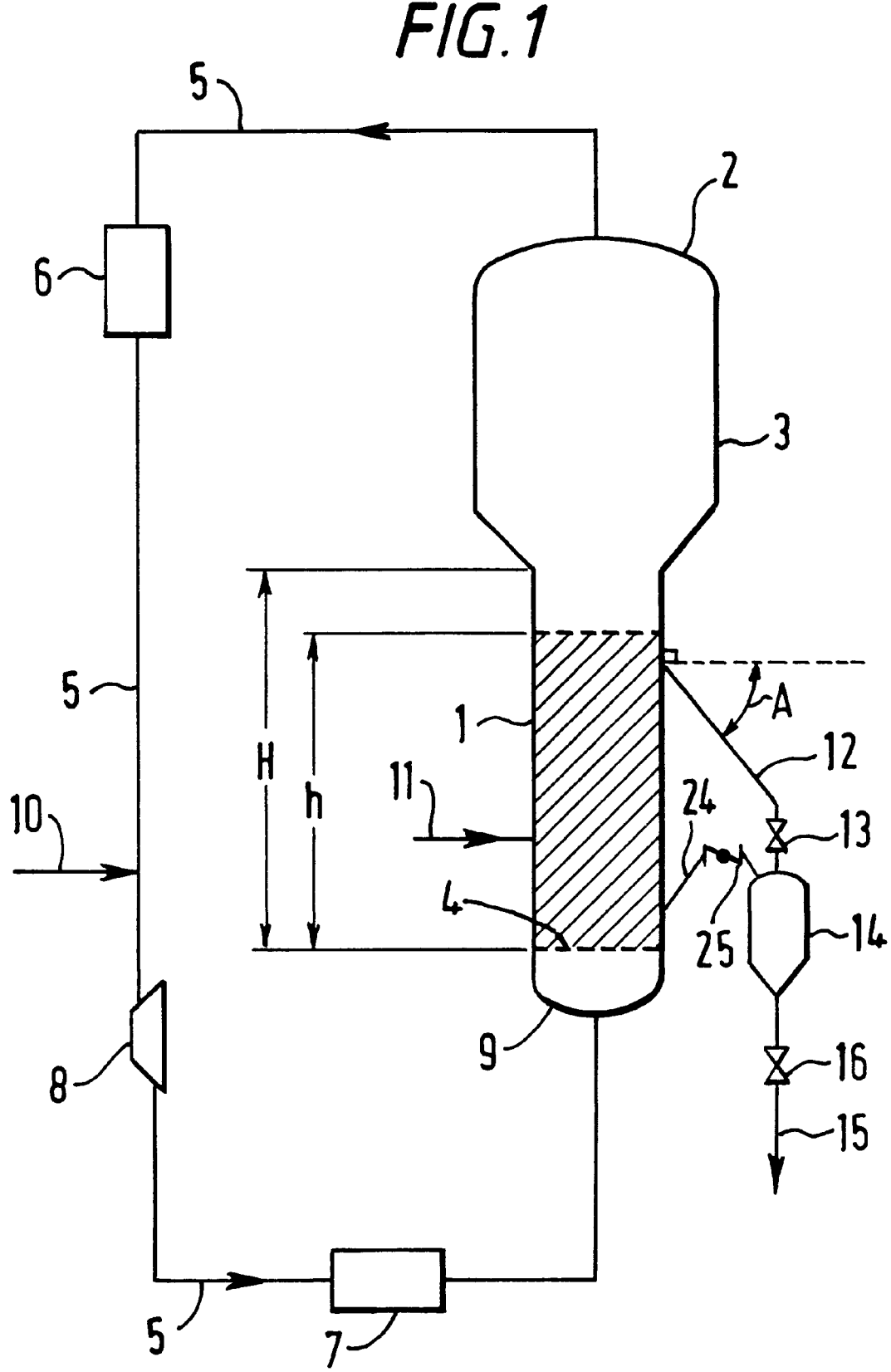
FIG. 1 shows diagrammatically equipment for gas-phase olefin polymerization, including particularly the device for withdrawing and emptying polymer according to the present invention.

FIG. 1 shows diagrammatically an illustration of the equipment for gas-phase polymerization of olefin(s) according to the present invention. The equipment includes:

(i) a cylindrical reactor (1) with a fluidized bed region and vertical side wall, provided with a top (2) and a base comprising a fluidization grid (4), (ii) an entry chamber (9) for a reaction gas mixture, situated under the grid (4) and communicating with the reactor (1) through the intermediary of the grid (4), (iii) a line (11) for introducing a catalyst, emerging into the side wall of the reactor (1), (iv) an external conduit (5) for circulation of the reaction gas mixture, connecting the top (2) of the reactor to the entry chamber (9) for the reaction gas mixture and including a compressor (8) and at least one heat exchanger (6, 7), (v) at least one conduit (12) for withdrawing polymer, provided with an isolation valve (13), connecting the side wall of the reactor (1) to a recovery gas lock (14), the conduit (12) leaving the side wall of the reactor (1) while being directed downwards, with the result that every part of the said conduit forms with a horizontal plane an angle A ranging from 35 to 90°, preferably from 40 to 90°, in particular from 45 to 90° or from 50 to 90°, and (vi) at least one conduit (24) for emptying polymer, provided with an isolation valve (25), connecting the side wall of the reactor (1) to the same recovery gas lock (14).

In its lower part, the recovery gas lock (14) preferably comprises a discharge conduit (15) provided with a discharge valve (16) which may be identical with the isolation valves (13) and (25).

The reactor (1) may advantageously have above it a calming or disengagement chamber (3) capable of reducing the entrainment of the polymer particles out of the reactor, the top of the chamber (3) forming the top (2) of the reactor. The fluidized bed may further advantageously occupy partially the disengagement chamber (3). In this case the point of departure of the withdrawal conduit may be situated at a level on said disengagement chamber, i.e. above the point linking the vertical cylindrical reactor and said disengagement chamber.

One or more feed conduits (10) for constituents of the reaction gas mixture, such as one or more olefins, for example ethylene or propylene or $C_4$ to $C_{10}$ alpha-olefins, one or more, preferably unconjugated, dienes, hydrogen, and one or more inert gases such as nitrogen or $C_1$ to $C_6$, preferably $C_2$ to $C_5$, alkanes, may emerge into the external circulation conduit (5).

FIGS. 2, 3 and 4 show diagrammatically alternative forms of the withdrawal device as shown in FIG. 1 and employing the same references. FIG. 2 shows particularly a withdrawal conduit (12) consisting of a single rectilinear conduit connecting the vertical side wall of the reactor (1) to the isolation valve (13). In FIG. 3, the withdrawal conduit consists of a joined succession of two rectilinear conduits (12a, 12b) which have respectively an angle A1 and a right angle A2, while the emptying conduit connecting the vertical side wall of the reactor to the isolation valve (25) consists of a single rectilinear conduit. In FIG. 4 the withdrawal conduit consists of a joined succession of three rectilinear conduits (12a, 12b, 12c) which have an angle A1, a right angle A2 and an angle A3 respectively.

Figure 5:
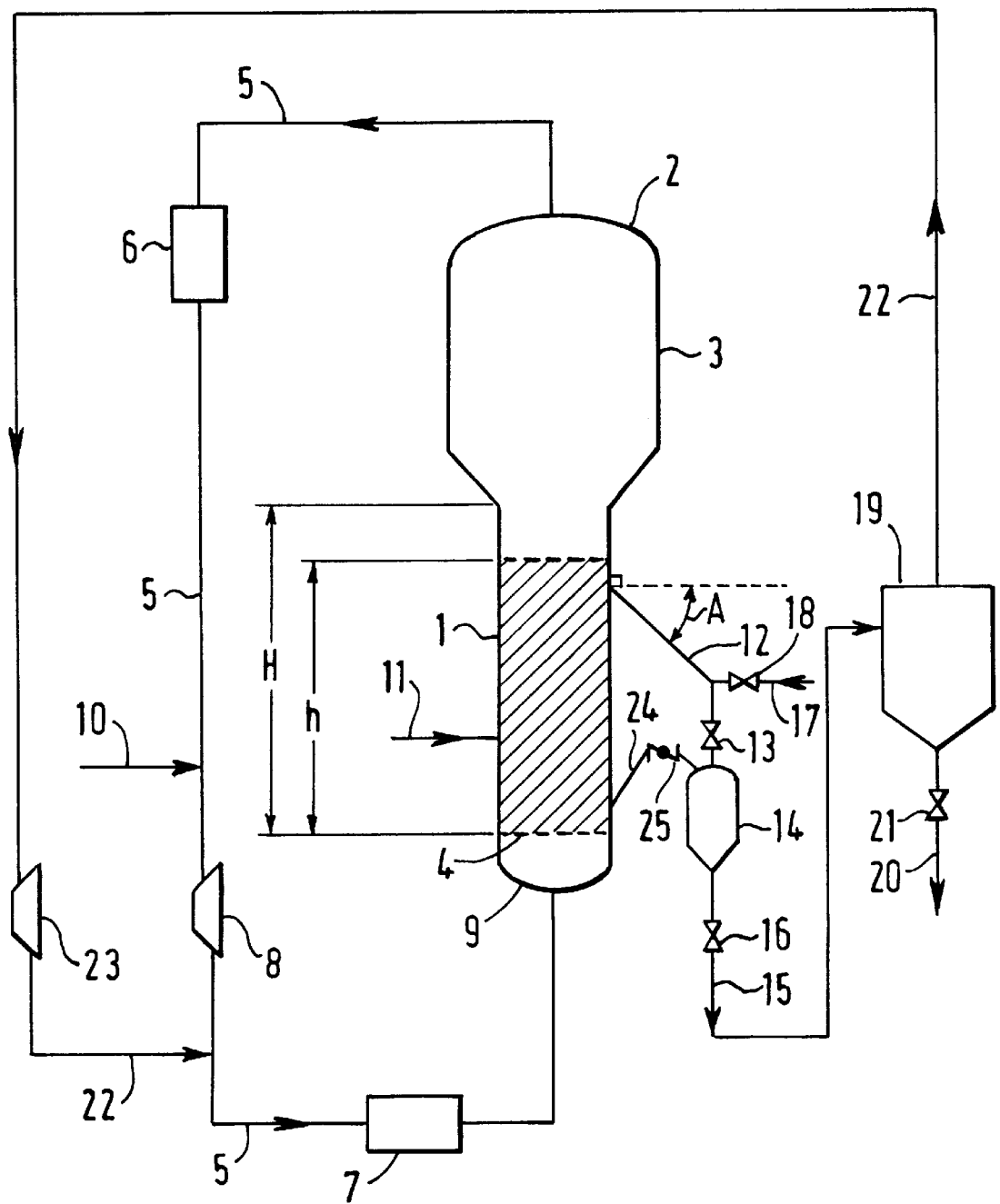
FIG. 5 shows diagrammatically equipment which is identical with that shown in FIG. 1 and including some preferred additional devices.
Figure 6A:
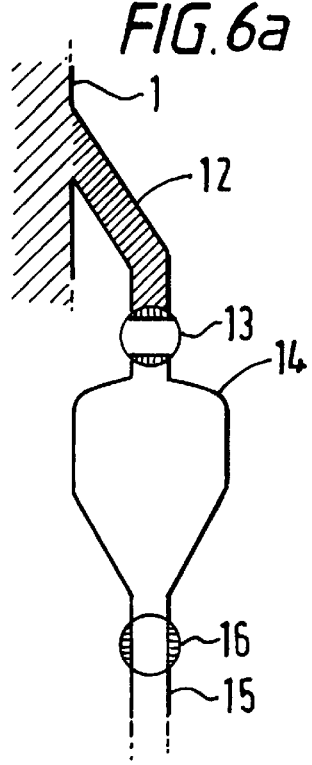
FIGS. 6a–d show diagrammatically the preferred stages for withdrawing the polymer according to the process of the present invention.
Figure 6B:
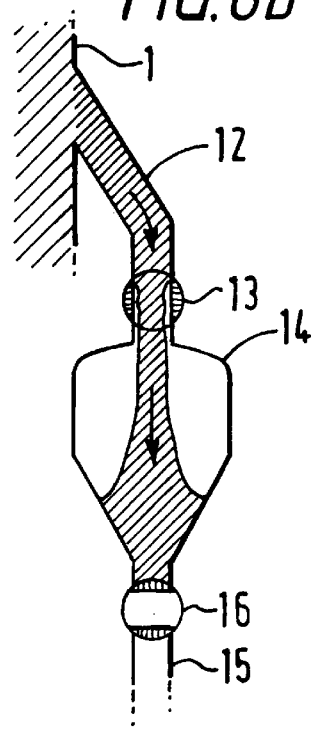
Figure 6C:
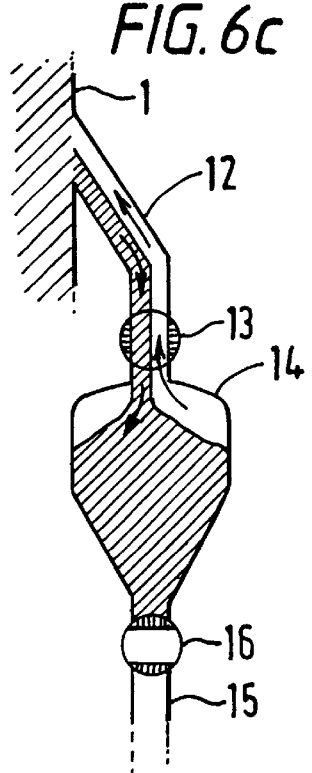
Figure 6D:
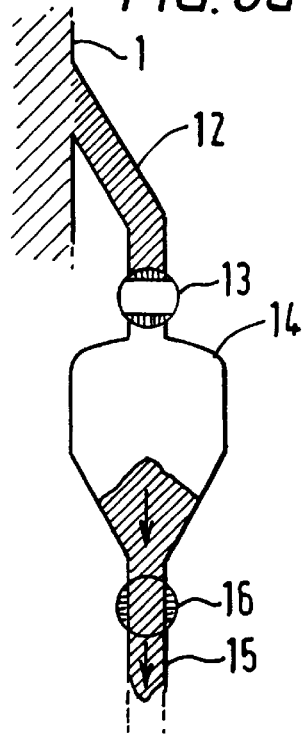
Figure 7A:
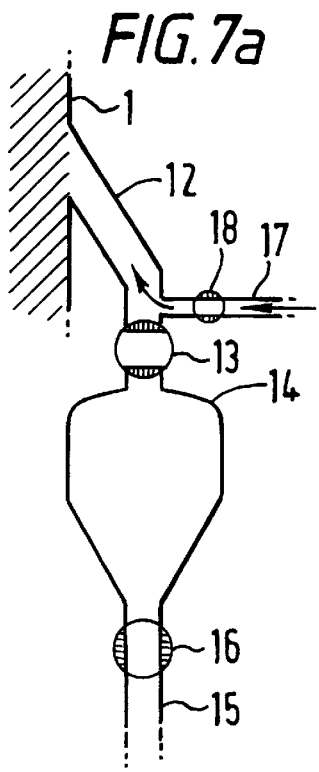
FIGS. 7a–e show diagrammatically the stages for with drawing the polymer according to an alternative form of the process of the present invention.
Figure 7B:
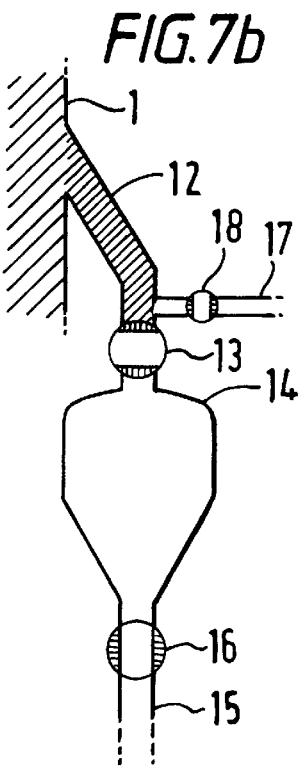
Figure 7C:
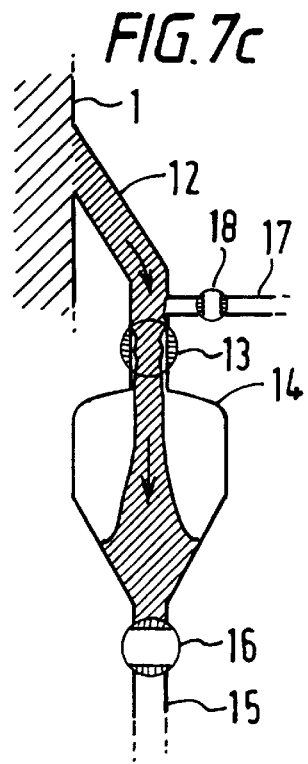
Figure 7D:
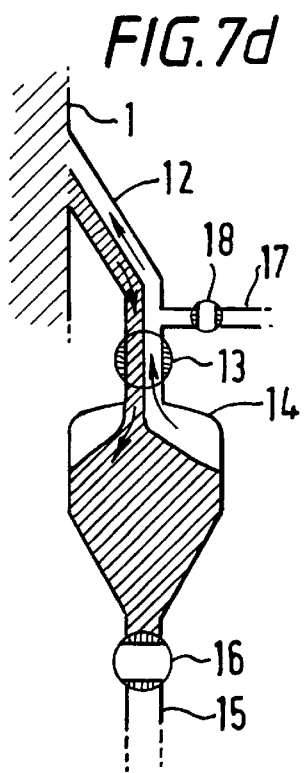
Figure 7E:
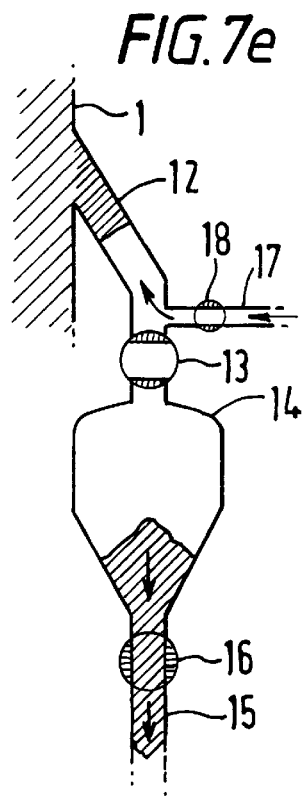

FIG. 5 shows diagrammatically a preferred and improved alternative form of the equipment as shown in FIG. 1 and employing the same references. It shows particularly a feed conduit (17) for a purging gas, emerging into the withdrawal conduit (12). The conduit (17) comprises a valve (18) for interrupting the purging. It emerges at any point of the conduit (12) situated between the point of departure where the said conduit leaves the side wall of the reactor (1) and the isolation valve (13). It preferably emerges near the valve (13) so as to enable the conduit (12) to be purged at will, since the purging gas prevents the deposition and the accumulation of polymer in the said conduit during an excessive period that could result in the partial or complete blocking of the said conduit due to agglomeration and possibly melting of the polymer particles. Since the isolation valve (13) is closed at the time of the opening of the valve (18), the purging gas escapes through the conduit (12) as far as the reactor (1).

An identical alternative form (17, 18) can also be advantageously applied to the emptying conduit, to avoid cluttering up the diagram, it has not been shown in the Figure.

FIG. 5 shows furthermore an additional device allowing the polymer to be transferred from the recovery gas-lock (14) into a decompression and degassing chamber (19) through the intermediary of the discharge conduit (15). The chamber (19) is capable of separating the polymer from the reaction gas mixture withdrawn with it. The separated polymer is discharged out of the chamber (19) by a conduit (20) preferably provided with a valve (21), in order to be next treated or subjected, for example, to additional degassing, and/or to be stored or granulated. The reaction gas mixture separated off in the chamber (19) is discharged out of the latter and is recycled into the external circulation conduit (5) by virtue of a recycling conduit (22) provided with a compressor (23).

Another subject of the present invention is a process for continuous gas-phase polymerization of olefin(s) in a reactor with a fluidized and optionally mechanically stirred bed and with a vertical side wall at an absolute pressure $P_1$ which is higher than atmospheric pressure, by continuous or intermittent introduction of a catalyst into the reactor, continuous introduction of olefin(s) into a reaction gas mixture passing through the reactor according to an upward stream, removal of the heat of polymerization by cooling the recycled reaction gas mixture, and recovering the polymer manufactured into a recovery gas lock provided with a discharge valve and connected to the side wall of the reactor by a withdrawal conduit equipped with an isolation valve, and emptying the polymer manufactured into the same recovery gas lock connected to the side wall of the reactor by an emptying conduit equipped with an isolation valve, a process which is characterized in that all flow of the polymer withdrawn by the withdrawal conduit from the side wall of the reactor as far as the gas lock is produced according to a direction pointing downwards and forming with a horizontal plane an inclination with an angle A at least equal to the angle of repose β of the polymer and not exceeding 90°, and in that the withdrawal conduit leaves the side wall of the reactor at a level of the reactor wall, above the fluidization grid, ranging from 0.60×H to 0.95×H, and in that the emptying conduit leaves the side wall of the reactor at a level of the reactor wall, above the fluidization grid, ranging from 0.01×H to 0.20×H.

The angle of repose, β, of the polymer is that defined by F. A. Zenz and D. F. Othmer in "Fluidization and Fluid-Particle Systems" published in "Reinhold Chemical Engineering Series" by Reinhold Publishing Corporation, New York, (1960), pages 85 to 88. It is also called "angle of repose α" by the Federation Européenne de la Manutention [European Handling Federation], Section II, "Continuous Handling/Special Characteristics of Bulk Products Transported in Pneumatic Conveyors" (FEM 2, 481), GB edition 1984, pages 9 and 10, and FIG. 2.

The angle of repose β of the polymers manufactured according to the present process, in particular of powders of polyethylene, of polypropylene or of a copolymer of ethylene or of propylene, can generally have a value higher than 30° and lower than 60°, preferably ranging from 35 to 55°, in particular from 40 to 45°.

The process of the invention is very particularly suitable for polyolefin powders, especially of linear high or low density polyethylene, for example of relative density ranging from 0.87 to 0.97, or of polypropylene. The polymers manufactured according to the present process may particularly be powders corresponding essentially to type B and sometimes to types A and B, according to the classification given by D. Geldart in "Gas Fluidization Technology" published in "A. Wiley-Interscience Publication" by John-Wiley & Sons (1986), pages 33 to 46. The polymers may consist of particles which have a mass-average diameter ranging from 300 to 2000, preferably from 500 to 1500 mm.

According to the present invention, all flow of the polymer withdrawn from the reactor as far as the gas lock is produced according to a downward inclination forming with a horizontal plane an angle A that is at least equal to the angle of repose β of the polymer and not exceeding 90°, preferably ranging from β+5° to 90°, in particular from β+10° to 90°. Thus, at no time from its being withdrawn from the reactor to arriving at the air lock will the polymer flow according to a horizontal plane or according to a low inclination forming with a horizontal plane an angle which is, for example, smaller than the angle of repose β of the said polymer.

At the point of departure of the polymer flow, where the polymer leaves the vertical side wall of the reactor in order to flow towards the air lock, the angle A of the initial inclination of the flow may assume any value equal to or higher than β, or β+5° or β+10°, but lower than 90°, for example not exceeding 85°, preferably not exceeding 80°. The angle A of the initial inclination of the flow may thus assume any value ranging from β to a value lower than 90°, preferably ranging from β+5° to 85° and in particular from β+10° to 80°.

By virtue of the greatly and perpetually inclined flow type, it has been observed that at the moment of the opening of the isolation valve bringing the reactor into communication with the gas lock, for example at an initial absolute pressure $P_2$ which is lower than $P_1$, the discharge valve of the gas lock being closed, the portion of the withdrawal conduit upstream of the isolation valve, that is to say between the reactor and the isolation valve, is substantially filled with polymer at rest which then, under the effect of the pressure difference, flows immediately into the gas lock according to an essentially dense-phase mode, in a first stage, until an absolute pressure substantially equal to $P_1$ is obtained in the gas lock, and which next continues in a second stage to flow into the gas lock according to an essentially gravity mode for a sufficient time to fill the gas lock with the desired quantity of polymer, the said quantity being next isolated in the gas lock by closing the isolation valve and recovered out of the gas lock on opening the discharge valve.

Thus, by virtue of the strong and perpetual inclination of the polymer flow between the reactor and the gas lock, the portion of the withdrawal conduit upstream of the isolation valve is filled with polymer at rest before the opening of the isolation valve, with the result that, when the latter opens, it is essentially polymer in a dense phase that enters the gas lock during the first stage and not essentially the reaction gas mixture as in the known former processes. In addition, when equalization of the pressure is substantially established between the gas lock and the reactor, generally in 1 or 2 seconds after the opening of the isolation valve, the strong and perpetual inclination of the polymer flow promotes, in the second stage, an essentially gravity flow mode which remains intense in the withdrawal conduit, despite an opposite current of gas escaping from the gas lock towards the reactor in step with the gas lock becoming filled with polymer.

The various types of solid flow mode in a gas, for example as dense phase, concurrent or countercurrent, are defined especially by F. A. Zenz and D. F. Othmer in "Fluidization and Fluid-Particle Systems", published in Reinhold Chemical Engineering Series" by Reinhold Publishing Corporation, New York (1960), pages 477 to 487, and by J. F. Davidson and D. Harrison in "Fluidization", published by Academic Press Inc., London (1971), pages 1 to 9.

It has been observed that the mean degree of filling of the gas lock according to the present invention is improved by at least 20%, preferably by at least 30%, when compared with the known former processes.

It is surprising to find that the process of the invention does not lead to partial or complete blocking of the withdrawal conduit when the polymer is particularly at rest in the said conduit just before the opening of the isolation valve and that it flows as dense phase as soon as the said valve is opened, it being known that the polymer withdrawn from the reactor contains active catalyst species, that it is still in contact with the uncooled reaction gas mixture and that the polymerization reaction is strongly exothermic.

In addition, it is now possible according to the present invention to combine this improved withdrawal with a more efficient partial or complete emptying of the reactor, this being by means of a simple equipment. This therefore represents an additional advantage according to the present invention because the withdrawal and emptying equipment can be easily housed in an industrial unit without demanding large spaces under the fluidized bed reactor.

The polymer may be withdrawn according to a cycle of operations which is repeated during the polymerization process in a regular or irregular manner, preferably with the aim of maintaining the fluidized bed at a substantially constant height in the reactor. By way of example, a cycle of operations is as follows.

At the beginning of the cycle, the isolation and optionally the discharge valves being closed, an absolute pressure $P_2$ prevails in the gas lock which is empty of polymer, $P_2$ being lower than the reactor pressure $P_1$. The ratio $P_1:P_2$ may range from 5:1 to 50:1, preferably 10:1 to 25:1. The (absolute) pressure $P_2$ is generally slightly higher than the ambient atmospheric pressure and may, for example, range from 0.11 to 0.2 MPa, preferably from 0.11 to 0.15 MPa.

The cycle may next comprise the opening of the isolation valve, preferably at a high speed, for example in less than 1 or 2 seconds, the discharge valve of the gas lock being closed. The isolation valve may be kept open for a sufficient time to recover the desired quantity of polymer in the gas lock, for example for a period of 1 to 120, preferably of 2 to 40, in particular of 3 to 20 seconds. Closing of the isolation valve may take place after an absolute pressure which is substantially equal to the absolute pressure $P_1$ of the reactor has been obtained in the gas lock. Immediately or very rapidly after the closing of the isolation valve the discharge valve is opened, preferably according to a high speed, for example in less than 1 or 2 seconds, in order to discharge the polymer out of the gas lock. The polymer may, for example, be discharged into a decompression and degassing chamber (19) through the intermediary of a conduit (15) such as those shown diagrammatically in FIG. 5. An absolute pressure $P_2$ may prevail in the chamber (19), which may be provided with a valve (21) in closed position at the time of discharging the polymer from the gas lock into the chamber, with the result that at the end of the cycle an absolute pressure $P_2$ is again encountered in the gas lock.

The total duration of the cycle, including the discharge of the polymer out of the gas lock, may, for example, be from 5 to 300, preferably from 8 to 60 seconds. It is preferable that the period separating the end of one cycle from the beginning of the following cycle should be as short as possible, for example from 5 to 300, preferably from 10 to 60 seconds.

If, however, the total duration of a cycle and/or the time separating the end of one cycle from the beginning of the following cycle are too long and create the risk of causing partial or complete blocking of the withdrawal conduit, it is preferable to employ a purging gas, for example through the intermediary of a conduit (17) emerging into the withdrawal conduit (12) upstream of the isolation valve (13) and preferably near the said valve, as shown diagrammatically in FIG. 5. The purging gas may be the reaction gas mixture from the reactor, cooled or otherwise, one or more constituents of this mixture, hydrogen, or an inert gas such as nitrogen or, for example, a $C_1$ to $C_6$, preferably $C_2$ to $C_5$, alkane, at a pressure that is higher than $P_1$. The feed conduit (17) for purging gas is provided with a valve (18). The purging gas is introduced into the withdrawal conduit upstream of the isolation valve in order to prevent the polymer from stagnating at rest in the said conduit when the isolation valve is closed, its introduction being preferably stopped a sufficient time before the reopening of the isolation valve, so as to leave the polymer the time to fill substantially the withdrawal conduit. In the cycle of the drawing-off operations described above by way of illustration the handling of the valve (18) may take place in the following manner. Immediately after the closing of the isolation valve (13) the valve (18) can be opened and can be kept open until the beginning of the following cycle, just before the opening of the isolation valve (13). The valve (18) is preferably closed shortly before the opening of the isolation valve (13), for example from 1 to 30, preferably from 2 to 20 seconds before, so as to fill the withdrawal conduit with polymer and consequently to promote a flow of the polymer as dense phase through the said conduit as far as the gas lock after the opening of the isolation valve (13). The velocity of the purging gas in the withdrawal conduit may be such that it is higher than the minimum velocity for fluidization of the polymer, or preferably such that it entrains the polymer out of the withdrawal conduit into the reactor.

For obvious reasons of cluttering up the diagrams, the emptying conduits have not been shown in FIGS. 6a–d and 7a–e.

FIGS. 6a–d show diagrammatically the stages for withdrawing the polymer from the reactor (1) as far as the gas lock (14) through the intermediary of the withdrawal conduit (12) and the isolation valve (13). In stage 6a the polymer is fluidized in the reactor (1) at a pressure $P_1$, a portion of the polymer is at rest in the portion of the conduit (12) upstream of the valve (13), the valve (13) is closed, the gas lock is empty of polymer at a pressure $P_2$ which is lower than $P_1$ and the valve (16) is open. In stage 6b the valve (16) is closed and the valve (13) is opened, the polymer flows essentially as dense phase through the conduit (12) under the effect of the pressure difference and pours into the gas lock (14), while the pressure in the gas lock rises to $P_1$. In stage 6c the pressure in the gas lock is equal to $P_1$, the polymer flows according to an essentially gravity mode through the conduit (12) and fills the gas lock (14), while the gas present in the gas lock escapes from the latter countercurrentwise to the polymer through the conduit (12) as far as the reactor. In stage 6d, the valve (13) is closed, the valve (16) is opened, the polymer present in the gas lock leaves the latter through the conduit (15) under the effect of a pressure difference, the pressure in the gas lock dropping to $P_2$, and fluidized polymer from the reactor (1) enters the portion of the conduit (12) upstream of the valve (13). The following cycle can then recommence.

FIGS. 7a–e show diagrammatically the stages for withdrawing the polymer from the reactor (1) into the gas lock (14) according to a preferred alternative form employing the same references as in FIG. 6, with, furthermore, a feed conduit (17) for the purging gas and a valve (18).

In stage 7a the polymer is fluidized in the reactor (1) at a pressure $P_1$, the valve (13) is closed, the valve (18) is open, the purging gas moves up the conduit (12) as far as the reactor and prevents the polymer from entering the conduit (12), the gas lock (14) is empty of polymer at a pressure $P_2$ which is lower than $P_1$ and the valve (16) is open. In stage 7b the valve (18) is closed, polymer moves from the reactor (1) into the portion of the conduit (12) upstream of the valve (13), where it rests. In stage 7c the valve (16) is closed, the valve (13) is opened, the polymer flows essentially as dense phase through the conduit (12) under the effect of the pressure difference and fills the gas lock (14) while the pressure in the gas lock rises to $P_1$. In stage 7d the pressure in the gas lock is equal to $P_1$, the polymer flows according to an essentially gravity mode through the conduit (12) and fills the gas lock (14), while the gas present in the gas lock escapes from the latter countercurrentwise to the polymer through the conduit (12) as far as the reactor. In stage 7e the valve (13) is closed, the valve (16) is opened, the polymer present in the gas lock leaves the latter through the conduit (15) under the effect of a pressure difference, the pressure in the air lock dropping to $P_2$, and the valve (18) is opened, allowing the purging gas to flush the polymer present in the conduit (12) as far as the reactor (1). The following cycle can then commence.

The isolation (13), discharge (16) and purging (18) valves are preferably valves with a spherical core and nonrestricted passage. They can function non-continuously, with in particular a high speed of opening and of closing produced, for example, in less than 1 or 2 seconds. They can also function according to a continuous movement of rotation, as described in French Patent No. 2 599 991.

The process for continuous gas-phase polymerization of olefin(s) is carried out in a reactor with a fluidized and optionally mechanically stirred bed, maintained at an absolute pressure $P_1$ which may range from 0.5 to 6, preferably from 1 to 4 MPa. The temperature of the fluidized bed may be maintained at a value ranging from 30 to 130° C., preferably from 50 to 110° C. A reaction gas mixture passes through the reactor at an upward velocity which may range from 0.3 to 0.8 m/s, preferably 0.4 to 0.7 m/s. The reaction gas mixture may contain one or more olefins, especially $C_2$ to $C_{10}$, preferably $C_2$ to $C_8$, for example ethylene or propylene, or a mixture of ethylene with at least one $C_3$ to $C_{10}$, preferably $C_3$ to $C_8$, olefin, for example propylene, 1-butene, 1-hexene, 4-methyl-1-pentene or 1-octene, and/or also with at least one diene, for example an unconjugated diene. It may also contain hydrogen and/or an inert gas such as nitrogen or, for example, a $C_1$ to $C_6$, preferably $C_2$ to $C_5$, alkane. The polymerization process may in particular be carried out according to the process described in Patent Application PCT No. 94/28032. It may be carried out in the presence of a catalyst comprising at least one transition metal belonging to groups 4, 5 or 6 of the Periodic Classification of the elements (approved by the Nomenclature Committee of the "American Chemical Society", see "Encyclopedia of Inorganic Chemistry", editor R. Bruce King, published by John Wiley & Sons (1994)). In particular, it is possible to employ a catalyst system of the Ziegler-Natta type including a solid catalyst comprising a compound of a transition metal such as those mentioned above and a cocatalyst comprising an organometallic compound of a metal belonging to groups 1, 2 or 3 of the Periodic Classification of the elements, for example an organoaluminium compound. High-activity catalyst systems have already been known for a number of years and care capable of producing large quantities of polymer in a relatively short time, with the result that it is possible to avoid the stage of removal of the catalyst residues present in the polymer. These high-activity catalyst systems generally include a solid catalyst essentially comprising transition metal, magnesium and halogen atoms. It is also possible to employ a high-activity catalyst comprising essentially a chromium oxide activated by a heat treatment and used in combination with a granular support based on a refractory oxide. The polymerization process is very particularly suitable for being employed with metallocene catalysts such as zirconocene, hafnocene, titanocene or chromocene, or Ziegler catalysts supported on silica for example based on titanium or vanadium. The abovementioned catalysts or catalyst systems may be employed directly as they are in the fluidized-bed reactor or may be converted beforehand into olefin prepolymer, in particular during a prepolymerization bringing the catalyst or catalyst system into contact with one or more olefins such as those mentioned above, in a hydrocarbon liquid medium or in gaseous phase, for example according to a non-continuous or continuous process.

The process is very particularly suitable for manufacturing polyolefins in powder form, in particular linear high or low density polyethylene of relative density ranging, for example, from 0.87 to 0.97, or polypropylene of copolymers of propylene with ethylene and/or $C_4$ to $C_8$ olefins or elastomeric copolymers of propylene with ethylene and optionally at least one unconjugated diene with a relative density ranging, for example, from 0.85 to 0.87.

The advantages of the equipment and of the process according to the invention consist in remarkably increasing the degree of filling of the discharge gas lock with polymer in each drawing-off operation, while avoiding the partial or complete blocking of the withdrawal device while allowing a partial or complete emptying of the reactor, and while allowing easy installation in industrial plants. The degree of filling may, in particular, be characterized by the weight quantity of polymer which is transferred at each operation of withdrawing from the reactor into the gas lock, a quantity expressed per unit of internal volume of the gas lock: this quantity is relatively large and may range from 200 to 450, preferably from 250 to 400, in particular from 300 to 400 kg/m$^3$, it being known that these values depend greatly on the apparent density of the polymer at rest.

The following example illustrates the present invention.

EXAMPLE

A gas-phase copolymerization of ethylene with 1-butene is carried out in equipment which is identical with that shown diagrammatically in FIG. 1. A cylindrical reactor (1) with a fluidized bed and a vertical side wall has an internal diameter of 3 m and a height H of 10 m and has a calming chamber (3) above it. At its base, the reactor has a fluidization grid (4) above which there is fluidized a bed of 18 tons of copolymer of ethylene and of 1-butene which has a relative density of 0.950, in the form of a powder consisting of particles which have a mass-average diameter of 750 mm, 90% by weight of the particles having a diameter ranging from 300 to 1200 mm. The apparent density of the fluidized powder is 300 kg/m$^3$. The height h of the fluidized bed is 8.0 m.

The reaction gas mixture passes through the fluidized bed at an absolute pressure of 2 MPa at an upward velocity of 0.6 m/s and at a temperature of 92° C. It contains, by volume, 30% of ethylene, 1% of 1-butene, 25% of hydrogen and 44% of nitrogen.

A catalyst of Ziegler-Natta type comprising titanium, magnesium and halogen atoms is prepared in the form of a prepolymer in a manner which is identical with Example 1 of French Patent No. 2 405 961. It is introduced intermittently into the reactor via the entry line (11).

In these conditions 3.8 tons/hour of copolymer of ethylene and of 1-butene are manufactured in the form of a powder which has the abovementioned characteristics and in particular an angle of repose, β, equal to 42°.

The device for withdrawing the copolymer comprises a withdrawal conduit (12) (as shown in FIG. 1), which has a length of 6 m and an internal diameter of 0.05 m. The conduit (12) leaves the side wall of the reactor (1) at a height of 7 m above the fluidization grid (4) in a downward direction with an initial angle, A, of 60°. Midway along its length it forms an elbow and is then directed vertically (A=90°) downwards. At its lower end it has an isolation valve (13) with a spherical core and nonrestricted passage of 0.05 m internal diameter, before emerging into a recovery gas lock (14) of 105 liters internal volume, $V_2$. In the lower part of the gas lock (14) there is an exit orifice provided with a discharge valve (16) communicating with a discharge conduit (15) of 0.05 m internal diameter, connected to a decompression and degassing chamber (19) provided with a recycling conduit (22) and a compressor (23) as well as a conduit (20) and a valve (21), such as those shown diagrammatically in FIG. 5.

The copolymer is withdrawn from the reactor (1) according to a cycle of operations as shown in FIG. 6, including the following stages:

the valve (13) is closed, the gas lock (14) is empty of copolymer at an absolute pressure $P_2$ of 0.12 MPa, the valve (16) is open and the conduit (12) upstream of the valve (13) is full of copolymer at rest;

the valve (16) is closed and the valve (13) is opened in approximately 1 second; the copolymer flows essentially as dense phase through the conduit (12) and pours into the gas lock (14) while the absolute pressure in the gas lock rises in less than 2 seconds from 0.12 to 2 MPa; the copolymer continues to flow into the gas lock (14) at an absolute pressure of 2 MPa according to an essentially gravity mode, while the gas present in the gas lock escapes countercurrent-wise to the copolymer through the conduit (12) as far as the reactor (1);

the valve (13) is kept open for 8 seconds;

the valve (13) is closed and the valve (16) is opened in approximately 1 second; the copolymer leaves the gas lock (14) and flows through the conduit (15) into the chamber (19) in approximately 3 seconds, while the absolute pressure in the gas lock decreases rapidly from 2 to 0.12 MPa and while copolymer enters from the reactor (1) into the conduit (12), where it rests.

The cycle of the operations is repeated every 30 seconds. At each cycle the quantity of copolymer withdrawn from the reactor through the intermediary of the gas lock is 32 kg. The degree of filling of the gas lock (14) with copolymer is 305 kg per $m^3$ of the internal volume of the gas lock.

The copolymerization process takes place in this way for several days without blocking of the withdrawal device.

When the reactor (1) is emptied only the copolymer powder situated above the branch connection for the withdrawal conduit (12) will be capable of being drawn off. This quantity of copolymer represents approximately ⅛ of the total quantity of copolymer. It will consequently be necessary to employ the emptying line in order to empty approximately ⅞ of the total volume.

The device for emptying the copolymer comprises an emptying conduit (24) (as shown in FIG. 1) of 0.05 m internal diameter. The conduit (24) leaves the side wall of the reactor (1) at a height of 1 m above the fluidization rate (4), being directed upwards. At its end it has an isolation valve (25) with a spherical core and nonrestricted passage of 0.05 m internal diameter, before emerging into the recovery gas lock (14).

The copolymer is emptied from the reactor (1) according to the following cycle of operations:

the valve (25) is closed, the gas lock (14) is empty of copolymer at an absolute pressure of 0.12 MPa, the valve (16) is open;

the valve (16) is closed and the valve (25) is opened; the copolymer flows essentially as dilute phase through the conduit (24) and pours into the gas lock (14) while the absolute pressure in the gas lock rises in less than 3 seconds from 0.12 to 2 MPa;

the valve (25) is kept open for 3 seconds with a maximum opening;

the valve (25) is closed and the valve (16) is opened in approximately 1 second; the copolymer leaves the gas lock (14) and flows through the conduit (15) into the chamber (19) in approximately 3 seconds, while the absolute pressure in the gas lock decreases rapidly from 2 to 0.12 MPa.

The cycle of the operations is repeated every 12 seconds. At each cycle the quantity of copolymer withdrawn from the reactor via this emptying conduit is 23 kg.

In approximately two hours the level of copolymer powder in the reactor (1) has reached the level of the branch connection of the emptying conduit.

The process has made it possible to withdraw and to empty the reactor with the advantages described above.

We claim:

1. Apparatus for the gas-phase polymerization of olefin(s), comprising a reactor having a vertical side wall, a fluidization grid located in said reactor and defining a fluidized bed region is said reactor above said fluidization grid, said side wall of the reactor having a height H above the fluidization grid, a conduit for external circulation of a reaction gas mixture connecting a top of the reactor to a base of the reactor below the fluidization grid, said conduit including a compressor and at least one heat exchanger, at least one withdrawal conduit for withdrawing polymer from the reactor having an isolation valve and at least one emptying conduit for emptying polymer from the reactor having an isolation valve, said withdrawal and emptying conduits connecting the side wall of the reactor to a single recovery gas lock having a discharge valve, wherein said at least one withdrawal conduit leaves the side wall of the reactor at a level of the side wall, above the fluidization grid, of from 0.60×H to 0.95×H while being directed downwards, with every part of the said withdrawal conduit forming with a horizontal plane an angle A of from 35 to 90° and said at least one emptying conduit leaves the side wall of the reactor at a level of the side wall, above the fluidization grid, of from 0.01×H to 0.20×H, said level where the emptying conduit leaves the side wall of the reactor being located below its point of entry into the recover gas lock.

2. The apparatus of claim 1, wherein the withdrawal conduit includes a first portion which leaves the side wall of the reactor at an angle A of from 45 to 75° and a second vertical portion joined to the first portion, said first and second portions being located in the withdrawal conduit on a side of the isolation valve opposite from the recovery gas lock.

3. The apparatus of claim 1, wherein an internal volume of the withdrawal conduit is between ½ and ⅟₅₀₀ of an internal volume of the recovery gas lock.

4. The apparatus of claim 1, wherein the isolation valve of the withdrawal conduit is situated adjacent the recovery gas lock.

5. The apparatus of claim 1, wherein a feed conduit for a purging gas having a valve is connected to the withdrawal conduit adjacent to and on a side of the isolation valve in the withdrawal conduit opposite from the recovery gas lock.

6. The apparatus of claim 1, wherein a feed conduit for a purging gas having a valve is connected to the emptying conduit adjacent to and on a side of the isolation valve in the emptying conduit opposite from the recovery gas lock.

* * * * *